United States Patent [19]

Mills et al.

[11] 4,075,160

[45] Feb. 21, 1978

[54] NON-CARCINOGENIC CARBON BLACK

[75] Inventors: King L. Mills; Paul H. Johnson, both of Bartlesville, Okla.

[73] Assignee: Phillips Petroleum Company, Bartlesville, Okla.

[21] Appl. No.: 681,976

[22] Filed: Apr. 30, 1976

[51] Int. Cl.² .............................................. C08K 3/04
[52] U.S. Cl. .............................. 260/42.47; 260/42.48; 423/445; 423/450; 423/460
[58] Field of Search ............. 260/37, 40, 42.46, 42.47, 260/42.48; 423/445, 450, 455, 460

[56] References Cited

U.S. PATENT DOCUMENTS

| 3,009,784 | 11/1961 | Krejci | 423/455 |
| 3,290,791 | 12/1966 | Keaton | 423/455 |
| 3,523,812 | 8/1970 | Kraus | 423/450 |
| 3,761,577 | 9/1973 | Dahmen et al. | 423/450 |

Primary Examiner—Lewis T. Jacobs

[57] ABSTRACT

A non-carcinogenic carbon black is produced by severely aftertreatng a carbon black-containing smoke inside of the carbon black reactor to result in a carbon black with a photelometer of 100% and a pitting degree (nitrogen surface area minus CTAB surface area) of about 7 square meters per gram or more, oxidizing this carbon black and thereafter high temperature drying wet pellets made from this carbon black at a temperature between about 500° and 600° F.

8 Claims, No Drawings

NON-CARCINOGENIC CARBON BLACK

The present invention relates to carbon black. More specifically the present invention relates to non-carcinogenic carbon blacks. In one of its aspects, the invention relates to the production of a non-carcinogenic carbon black. Yet another aspect of this invention relates to a polymer mixture containing such a non-carcinogenic carbon black.

BACKGROUND OF THE INVENTION

It is well known in the art that carbon black can be produced by pyrolytic decomposition of various hydrocarbon feedstocks. The widest use of such carbon blacks is in tires as a reinforcing agent for rubber. The presence or absence of carcinogenic materials in very low quantities does not constitute a problem in these applications.

If, however, carbon black is to be used either as a food ingredient or in applications where it gets in contact with food, such as in wrapping materials, rubber hoses, or plastic pipes that come into contact with food materials or ingredients for food, the product is subject to rigid controls and has to pass certain tests before its use in these applications is approved. One of the problems is that extremely small but still detectable quantities of condensed aromatics can be present in carbon blacks. Benzo (a) pyrene is an example of a known carcinogen among the many condensed aromatic ring structures. It would thus be desirable to have a process available by which a carbon black being essentially free of such materials, in particular being free of benzo (a) pyrene can be produced.

THE INVENTION

It is thus one object of this invention to provide a non-carcinogenic carbon black.

Another object of this invention is to provide a process for making such a non-carcinogenic carbon black.

A further object of this invention is to provide a polymer composition comprising a polymer and a carbon black being essentially free of carcinogenic materials.

Still another object of this invention is to provide a polymer pipe containing carbon black as a filler material or as a reinforcing agent which pipe can be used for transporting therethrough ingredients intended for human consumption.

These and other objects, advantages, details, features and embodiments of this invention will become apparent to those skilled in the art from the following detailed description of the invention, the appended claims and the examples.

In accordance with this invention, it has now been found that a non-carcinogenic carbon black can be produced in a furnace carbon black process by pyrolytically decomposing a hydrocarbon feedstock to form a smoke containing a carbon black having a CTAB surface area of about 80 $m^2/g$ or more and subjecting the thus produced carbon black to three severe treatments. The first treatment is a severe aftertreating of the smoke in order to obtain a photelometer of the carbon black of about 100% and a pitting degree (expressed as the difference between the nitrogen surface area and the CTAB surface area) of at least 7 $m^2/g$ or more. More specifically, the pitting value ($N_2SA$ minus CTAB SA) is 7 $m^2/g$ or more for a carbon black of 80 $m^2/g$ CTAB SA and is 15 $m^2/g$ or more for a carbon black of 120 $m^2/g$ CTAB SA. For carbon blacks with other CTAB surface areas, the minimum pitting value is readily obtained from these two values by interpolation. This severe aftertreating is done by a late quench and/or by secondary air as will be explained later. The second treatment is an oxidation of the carbon black and is carried out on the black preferably after it has been removed from the carbon black-containing smoke. The third treatment finally is a relatively severe drying step in which the carbon black after having been wet pelleted with an aqueous pelleting agent is dried to a temperature of about 500° to about 600° F. It has been found that by this procedure of combined treatment steps a carbon black can be produced that is practically free of benzene extractible materials and that is particularly essentially free of benzo (a) pyrene. The process of this invention thus furnishes a non-carcinogenic carbon black.

In the definitions given above, the nitrogen surface area is determined in accordance with ASTM D-3037-71T, Method A. The CTAB surface area is measured as described by J. Janzen and G. Kraus, in Rubber Chemistry and Technology, 44, 1287 (1971). The photelometer, finally, is determined by the standard procedure ASTM D-1618-58T.

The carbon black made in accordance with the process of the present invention contains less than about 0.05 wt. % of benzene extractibles. This weight percentage is based on the dry carbon black as 100%.

The carbon black in accordance with this invention can be produced from any kind of low carbon residue feedstock. The carbon residue content of the feedstock is determined by diluting the feedstock with normal pentane, and then filtering the residue collected, drying, and weighing the dried residue. The feedstock to be used preferably contains less than about 0.2 wt. % of carbon residue. Among the various feedstocks, the highly aromatic feedstocks have the best overall results in the process. Particularly preferred feedstocks are solvent extracted distillates from catalytic cracking of gas oils or residue oils. Especially useful and therefore preferred are $SO_2$ extract oils, toluene and mixtures thereof. An $SO_2$ extract oil is a cracked oil being liquid/liquid extracted using liquid $SO_2$ to concentrate the aromatics in this oil.

The heat necessary for the pyrolytic decomposition of the feedstock can be generated by various means well known in the art. It is presently preferred to combust a fuel with air such as to produce hot combustion gases and to mix these hot combustion gases with the feedstock. Instead of this procedure or in addition thereto, a portion of the feedstock may be combusted to produce hot combustion gases. The oxidant used for the combustion of the fuel or of the combustion of a portion of the feedstock is generally and preferably air or oxygen or oxygen-enriched air.

Some materials can be added to the reaction mixture in the furnace in order to achieve certain special results, as long as these additives do not adversely interfere with the use of the carbon black produced in contact with food. Thus small quantities of up to 20 ppm of potassium can be added to the feedstock, e.g., in the form of potassium chloride to reduce the structure. Preferably, however, no potassium is added.

The carbon black as defined above can be produced in any of the well known reactors that are useful for the production of a carbon black having the specific surface area properties defined. Preferably the carbon black in the present invention is produced in an O-type carbon black reactor such as the one disclosed in detail in the U.S. Pat. No. 2,541,700. From the carbon black-containing smoke leaving this O-type reactor after the severe aftertreatment in the reactor which is to be described in the following, the carbon black is removed. This is done by well known techniques. Most preferably the smoke is passed through elongated filter bags of glass fiber or polytetrafluoroethylene fiber material which are periodically emptied to recover the accumulated flocculent carbon black. This flocculent carbon black then is wet pelleted and dried. The wet pelleting is done by introducing the flocculent carbon black and an aqueous pelleting agent into a pelleter in which a pinned shaft is rotated. The wet carbon black pellets are finally dried at a temperature of about 500° to 600° F. If is preferred to include an oxidizing agent in the pelleting liquid. Hydrogen peroxide and $HNO_3$ are examples for such oxidizing agents.

It is important for this invention to subject the carbon black to a combination of three special treatments. The first treatment is a severe aftertreatment of the carbon black-containing smoke to result in a photoelometer of the carbon black of 100% and a pitting degree (nitrogen surface area minus CTAB surface area) expressed in square meters per gram as defined above. The severe aftertreatment is achieved either by a late quench or by a secondary air injecton, or by both treatments combined. Quench, as is well known in the art, is the contacting of the carbon black containing hot smoke with a cooling agent such as water or cooled smoke to stop the carbon black from further physical and chemical changes. Late quench herein refers to the deferral of such a quenching step to a location further downstream than the location of normal quenching in order to achieve the 100% photelometer and the high pitting degree as defined by the minimum value for the difference between nitrogen surface area and CTAB surface area. Another possible severe aftertreatment is the injection of secondary air into the reactor downstream of the main carbon black forming zone and upstream of a quench zone. This secondary air injection or afterburning has the same effect as the late quench. Both procedures can be used combined.

The second treatment of the carbon black is an oxidation step. This step as such is also known in the art. Any of the known oxidation procedures can be employed. Preferably a water-soluble oxidant such as hydrogen peroxide or nitric acid — the latter being preferred — is dissolved in the aqueous pelleting liquid. Thus the oxidation occurs in this special embodiment after the pelleting and essentially during the final phase of the drying step. Thus the second and third treatments actually in this embodiment are carried out simultaneously. The preferred method of causing the oxidation of the black is to use an aqueous $HNO_3$ as the pelleting liquid. The quantity of $HNO_3$ present in the pelleting mixture is generally 2-10 wt. % $HNO_3$ based on the weight of carbon black being 100%.

The third treatment of the carbon black is a relatively severe drying step. The carbon black is wet pelleted utilizing any of the known aqueous pelleting liquids. The wet pellets which may contain between 40 and 60% of aqueous pelleting solution, the rest being essentially carbon black, then are dried so that their temperature is raised at least at the end of the drying zone to a value of about 500° to 600° F, preferably about 500° to 550° F.

In accordance with a further embodiment of this invention, there is provided a novel composition of matter. The composition of this invention is either a rubber composition or a thermoplastic composition. The rubber composition of this invention consists essentially of 100 parts by weight of rubber and 1 to 200 parts by weight of the carbon black. The thermoplastic polymer composition of this invention consists essentially of 100 parts by weight of thermoplastic polymer material and 0.1 to 50 parts by weight of the carbon black. For certain applications of the plastic polymer material, e.g., in contact with milk or edible oils, a quantity of 0.1–10 parts by weight of carbon black per 100 parts by weight of the thermoplastic polymer is preferred. The carbon black utilized in these compositions is that carbon black that is obtained by the process of this invention as defined above. Examples for the rubber that can be utilized for the rubber composition of this invention are natural rubber, synthetic rubbers such as polymers of conjugated acyclic alkadienes and copolymers of conjugated acyclic alkadienes with monovinyl arenes, in particular, polybutadienes or butadiene/styrene copolymers, as well as mixtures of such rubbers. The preferred range of carbon black content for the rubber composition of this invention is 20 to 80 parts by weight of carbon black per 100 parts by weight of rubber. A typical rubber composition useful for hoses and tubing would be essentially composed of the following ingredients in parts by weight

| Rubber | 100 |
|---|---|
| Carbon black (in accordance with this invention) | 30–50 |
| Extender oil | 24–45 |
| Standard additives (e.g., antioxidants, etc). | |

Examples for plastic materials useful in the compositions of this invention are low density and high density polyethylene, general purpose and impact resistant polystyrene, flexible and rigid polyvinylchloride, acrylonitrile, butadiene/styrene copolymers, polypropylene, polycarbonates, polyamides such as nylon, phenolformaldehyde resin, epoxy resins, polyurethanes. The preferred range for the carbon black content in the thermoplastic composition of this invention is 0.1 to 10, preferably 0.5 to 3 wt. % of carbon black per 100 parts by weight of the thermoplastic polymer.

Yet a further embodiment of this invention resides in a pipe that can be used for transporting materials intended for human consumption. This pipe consists essentially of a plastic or rubber composition as defined above. Preferably and typically this pipe has an outside diameter in the range of ⅛ to 12 inches, whereas the wall thickness of this pipe is within the range of 1/16 to ¾ inches. Such a pipe or hose combines the advantages of absorbing any ight that might cause deterioration of the materials flowing through this pipe, while at the same time the carbon black contained in this pipe is non-carcinogenic. Particularly advantageous are pipes made from high density polyethylene containing the non-carcinogenic carbon black defined above in quantities shown above. These high density polyethylene pipes are very sturdy and can be readily connected to each other.

The invention will still be more fully understood from the following examples which are intended to show preferred embodiments of this invention but not to limit the scope thereof.

EXAMPLE I

In a reactor as described in the U.S. Pat. No. 2,564,700, a carbon black was produced. The reactor had the following dimensions:

| | |
|---|---|
| Diameter of the precombustion chamber (pcc): | 37 inches; |
| Axial length of the precombustion chamber: | 12 inches; |
| Diameter of the reaction section: | 15 inches, w/10 inch diameter choke of about 15 in. axial length at reactor inlet; |
| Axial length of the reaction section from downstream end of pcc to the quench: | 15½ feet. |

Into this reactor the ingredients shown in the following tabulation under the conditions shown in the following tabulation were introduced. The properties of the carbon black obtained are also shown in the following tabulation.

TABLE

| | | |
|---|---|---|
| Oil: | | |
| | $SO_2$ extract oil, (BMCI of 92, mid boiling point 680° F, preheated to 390° F), gallons per hour | 240 |
| Air: | | |
| | Tangential, Standard Cubic Feet per hour (SCF/H), (preheated to 530° F) | 200,000 |
| Fuel Gas: | | |
| | Natural gas, Tangential, SCF/H | 14,300 |
| Air/Oil, | SCF/Gal | 833 |
| Air/Gas, | Vol. Ratio | 14 |
| Potassium, | added as KCl, ppm K+ (based on carbon black | 12 |
| Pelleting | Solution, aqueous $HNO_3$ (50/50 weight ratio of carbon black and pelleting solution ° pelleter), wt. % $HNO_3$ | 3 |
| Dryer, °F | (at the outlet end of dryer) | 500–550 |
| Carbon black properties: | | |
| | $N_2SA$, $m^2/gm$ | 142 |
| | CTAB, $m^2/gm$ | 113 |
| | ($N_2SA$-CTAB) $m^2/gm$ | 29 |
| | DBP, cc/100 gm,[1] | 84 |
| | 24M4, cc/100 gm,[2] | 80 |
| | Photelometer | 100 |
| | DPG[3] | 25 |
| | pH[4] | 5.5 |

[1] ASTM D-2414-79;
[2] U.S. Patent 3,548,454, as measured after crushing, by Method B, ASTM 2414-70;
[3] Number of microequivalents of diphenylguanidine (DPG) absorbed by 1 gram of black determined by back-titration of the benzene solution of DPG with standard methanolic HCl using tetrabromophenylsulfon phthalein indicator;
[4] ASTM D-1512.

This thus produced carbon black having been severely aftertreated by the quench being 15½ feet downstream from the precombustion chamber, oxidized by the nitric acid treatment and subjected to a relatively high dryer temperature of 500°–550° F, was analyzed for the content of benzene extractibles, the content of benzo (a) pyrene, as well as for other polynuclear aromatic compounds. The results of this analysis are shown in the following table:

TABLE II

| Carbon black purity Ingredients: | (quantities in ppm by weight based on carbon black unless otherwise indicated). ppm by wt. on carbon black |
|---|---|
| Benzo (a) pyrene | nil |
| Naphthalene | nil |
| Acenaphthylene | nil |
| Phenanthrene | nil |
| Anthracene | nil |

TABLE II-continued

| Carbon black purity Ingredients: | (quantities in ppm by weight based on carbon black unless otherwise indicated). ppm by wt. on carbon black |
|---|---|
| Methylfluorene | nil |
| Dimethylbiphenyl | nil |
| Fluoranthene | <0.1 |
| Pyrene | <0.1 |
| Benzfluoranthene | nil |
| Chrysene | nil |
| Benzo (e) pyrene | nil |

The lower limit of detectability of the various ingredients is about 0.05 ppm.

Also determined as not present in this carbon black are: biphenyl, acenaphthene, fluorene, dimethylbiphenyl, methylenephenanthrene, benzofluorene, cyclopenta (c,d) pyrene, 3,4-benzophenanthrene, triphenylene, tetraphene, naphthanthracene, tetracene, ethylfluoranthrene, terphenyl, 2-methyl-3,4-benzophenanthracene, binaphthyl, (7,12-dimethyl) benz (a) anthracene, anthrathrene, benzo (ghi) perylene, indene (1,2,3-cd) pyrene, and dibenz (a,h) anthracene.

Total benzene extractibles, ppm: 36

The results show that the carbon black produced in accordance with this invention has an extremely low content of benzene extractibles and no, or a neglectible, content of benzo (a) pyrene.

EXAMPLE II

The carbon black produced in accordance with Example I was formed into a rubber composition in accordance with the following recipe in which the figures are shown as parts by weight.

| Recipe | |
|---|---|
| Carbon black | 40 |
| Philprene 1708[1] | 68.25 |
| SMR-5LBD[2] | 50 |
| Circosol 4240[3] | 1.25 |
| Zinc oxide | 4 |
| Stearic acid | 2 |
| Agerite resin D[4] | 1.5 |
| Flexone 3C[5] | 1.5 |
| Paraffin wax | 1.5 |
| Carbowax 6000[6] | 2 |
| Sunproof Super Wax[7] | 2.5 |
| Santocure[8] | 1 |
| Diphenylguanidine | 0.1 |
| Sulfur | 3 |

[1] Philprene 1708 - Cold, oil extended non-staining SBR rubber: 100 parts by weight of low ash, low water absorption light colored butadiene-styrene (75-25 weight ratio) copolymer, emulsion polymerized at 41° F, using fatty acid soap and 37½ parts of naphthenic processing oil.
[2] SMR-5LBD - Natural rubber broken down to preselected Mooney value of 54 raw Mooney at 212° F.
[3] Circosol 4240 - Naphthenic type 103 (ASTM D-2226), 47½ weight percent aromatics; flash point 430° F, aniline number 172° F; an extender oil.
[4] Agerite Resin D - 1,2-dihydro-2,2,4-trimethylquinoline; an antioxidant.
[5] Flexone 3C - N-isopropyl-N'-phenyl-p-phenylene diamine; an antioxidant.
[6] Carbowax 6000 (Union Carbide) - A polyethylene glycol to minimize cracking and ozone effects.
[7] Sunproof Superwax (Sun Oil Co.) - A mixture of hydrocarbon waxes, specific gravity 0.93; melting point 71 to 75° C; to minimize cracking and ozone effects.
[8] Santocure - N-cyclohexyl-2-benzothiazole sulfenamide; an accelerator.

This composition was mixed and blended in a 6 × 12 inches roll mill for 10½ minutes at a mill gauge of 0.05 inch and a temperature of about 158° F. The rubber composition obtained was thereafter evaluated in accordance with standard techniques and the results obtained are shown in the following table.

TABLE III

| | | |
|---|---|---|
| Compound Mooney viscosity ML4 at 212°F | | 42.5 |
| Scorch at 280°F (minimum Mooney) | | 30.5 |
| (5 point rise, min.) | | 6.2 |
| Minutes Cure at 310° F | | |
| 200% Modulus, psi | 20 min. | 440 |
| | 30 min. | 460 |

TABLE III-continued

| | | |
|---|---|---|
| 300% Modulus, psi | 45 min. | 440 |
| | 20 min. | 890 |
| | 30 min. | 880 |
| | 45 min. | 850 |
| Tensile, psi | 20 min. | 2400 |
| | 30 min. | 2420 |
| | 45 min. | 2170 |
| Elongation, % | 20 min. | 510 |
| | 30 min. | 520 |
| | 45 min. | 500 |
| Shore Hardness on tensile ends: | | |
| | 20 min. | 49 |
| | 30 min. | 52 |
| | 45 min. | 51 |

This example shows that using the carbon black in accordance with this invention, which is essentially non-carcinogenic, a useful rubber composition can be made that can be formed into tubes or gaskets that can be put into contact with materials intended for human consumption.

EXAMPLE III

A typical recipe for a rubber composition useful for the production of milk tubing is given in the following, the figures being parts by weight.

| | |
|---|---|
| Paracril BJ[(1)] | 40 |
| Philprene ® 1502[(2)] | 60 |
| Carbon black (in accordance with this invention | 40 |
| Dioctylphthalate | 32 |
| Zinc oxide | 3 |
| Stearic acid | 2 |
| Flexone 3C[(3)] | 1 |
| Sunproof Superwax[(4)] | 1 |
| Sulfur | 1.75 |
| Altax[(5)] | 1.75 |
| Diphenylguanidine | 0.25 |

[(1)]A commercially available acrylonitrile polymer.
[(2)]A commercially available rubber.
[(3)]An antioxidant.
[(4)]An anti-crack agent.
[(5)]An accelerator.

Reasonable variations and modifications which will become apparent to those skilled in the art can be made in the present invention without departing from the spirit and scope thereof.

We claim:

1. A process for the production of a non-carcinogenic carbon black comprising
   a. pyrolytically in a carbon black furnace decomposing a hydrocarbon feedstock having a low carbon residue of less than about 0.2 weight % such as to form a smoke containing a carbon black having a CTAB surface area of about 80 $m^2/g$ or more,
   b. aftertreating said smoke by subjecting it to at least one of the steps of late quenching and secondary air injecting such as to produce a smoke containing a carbon black having a photelometer of about 100% and a pitting degree defined as the difference between the nitrogen surface area and the CTAB surface area of 7 $m^2/g$ or more,
   c. oxidizing the carbon black and pelleting the carbon black with an aqueous pelleting agent, and
   d. drying the wet carbon black pellets at a temperature of about 500° to 600° F.

2. A process in accordance with claim 1 wherein said feedstock is selected from the group consisting of toluene and $SO_2$ extract oil.

3. A process in accordance with claim 1 wherein said carbon black is oxidized by contacting the carbon black with an aqueous solution of $HNO_3$ so that the mixture of carbon black and aqueous pelleting agent contains about 2 to 10 wt. % of $HNO_3$ based on the carbon black as 100%.

4. A process in accordance with claim 1 wherein said aftertreating of said carbon black containing smoke is carried out by a late quench step and/or by the introduction of secondary air between the main carbon black forming reaction zone and a quench location.

5. A non-carcinogenic carbon black obtained by a pyrolytic decomposition in a carbon black furnace of a hydrocarbon feedstock having a carbon residue of less than about 0.2 weight percent into a carbon black containing smoke, aftertreating said carbon black containing smoke by subjecting it to at least one of the steps of late quenching and secondary air injecting, oxidizing the so-produced carbon black and pelleting the carbon black with an aqueous pelleting agent and drying the wet carbon black pellets at a temperature of about 500° to 600° F., said carbon black being further characterized by having
   a CTAB surface area of 80 $m^2/g$ or more
   a pitting degree of 7 $m^2/g$ or more, said pitting degree being defined as the difference between the nitrogen surface area in the CTAB surface area,
   a photelometer of 100 percent, and
   a content of benzene extractables of less than 0.05 weight percent.

6. A polymer composition consisting essentially of 100 parts by weight of a polymer selected from the group of rubbers and thermoplastic polymers and about 1 to about 200 parts by weight of carbon black of claim 5 per 100 parts by weight of rubber and 0.1 to 50 parts by weight of carbon black of claim 5 per 100 parts by weight of thermoplastic polymer.

7. A polymer composition in accordance with claim 5 containing about 20 to 80 parts by weight of said carbon black per 100 parts by weight of rubber.

8. A polymer composition in accordance with claim 6 consisting essentially of 100 parts by weight of a thermoplastic polymer and 0.1 to 10 parts by weight of a carbon black produced in accordance with claim 1.

* * * * *